United States Patent [19]
Frohbach et al.

[11] 4,310,847
[45] Jan. 12, 1982

[54] COLOR TELEVISION FILM SCANNING SYSTEM USING UNIFORM MOTION AND LINE ARRAYS

[75] Inventors: Hugh F. Frohbach, Sunnyvale; Albert Macovski, Menlo Park; Norman A. Peppers, Belmont; Thomas L. Siwecki, Walnut Creek; Louis F. Schaefer, Palo Alto, all of Calif.

[73] Assignee: World Development Laboratories, Los Angeles, Calif.

[21] Appl. No.: 930,984

[22] Filed: Aug. 4, 1978

[51] Int. Cl.³ .............................................. H04N 9/04
[52] U.S. Cl. ...................................................... 358/54
[58] Field of Search ..................................... 358/4–9, 358/41, 54, 47, 81–82, 151–152, 241

[56] References Cited

U.S. PATENT DOCUMENTS

| 2,560,351 | 7/1951 | Kell et al. | 358/54 X |
| 2,593,925 | 4/1952 | Sheldon | 358/82 |
| 2,733,291 | 1/1956 | Kell | 358/47 |
| 2,912,487 | 11/1959 | Horsley | 358/6 |
| 3,158,683 | 11/1964 | Waggener | 358/151 |
| 3,612,759 | 10/1971 | Nelson et al. | 358/6 X |
| 3,702,896 | 11/1972 | Kurahashi et al. | 358/7 |
| 3,803,353 | 4/1974 | Sanderson et al. | 358/54 X |
| 3,935,589 | 1/1976 | Ohta | 358/54 |
| 3,949,161 | 4/1976 | Fujishima et al. | 358/54 |
| 3,952,328 | 4/1976 | Biber | 358/54 |
| 4,016,598 | 4/1977 | Yamanaka | 358/41 |

OTHER PUBLICATIONS

SMPTE Journal, Dec. 1978, vol. 87, No. 12, pp. 815-820: A Continuous–Motion Color Film Telecine Using CCD Line Sensors, Poetsch.

Primary Examiner—Aristotelis M. Psitos

[57] ABSTRACT

A color image is recorded on film at the television field rate. A portion of the film is illuminated, corresponding to a line in the color image, and decomposed into its component colors. The decomposed light from the line is imaged onto two or more line scanning photosensitive arrays which provide scanned signals. These scanned signals are decoded and used to provide the standard color television signals.

12 Claims, 7 Drawing Figures

COLOR TELEVISION FILM SCANNING SYSTEM USING UNIFORM MOTION AND LINE ARRAYS

BACKGROUND OF THE INVENTION

1. Field of the Invention

This invention relates to color television recording and playback systems. In a primary applicationn the invention relates to the playing back of the information recorded on color film in a color television format. Another application of the invention relates to the photographic recording of live scenes using a conventional motion picture camera with the resultant images scanned and converted into color television images.

2. Description of Prior Art

A variety of approaches have been used for the recording and playback of color television information. Film systems represent an attractive approach to the recording and playback of color television information. They have high information density, relatively low cost, and can be used in relatively simple home movie cameras and played back on home color television receivers.

Existing color television playback systems from film have various practical and economic problems. The commercial studio systems use expensive color television camera systems requiring three carefully registered television camera tubes. Other approaches use encoded systems where the color information is encoded onto black and white film. One such encoding format is described in U.S. Pat. No. 3,378,633 issued to A. Macovski. In this patent the red and blue information are encoded as amplitude modulation of high frequency gratings. This system requires a relatively high resolution television camera to resolve the high frequency color carriers. Also, the luminance resolution must be degraded somewhat to prevent high-frequency luminance detail from appearing in the high-frequency color signals.

One solution to this problem is the use of separate recorded frames for the luminance and chrominance information as in a system called EVR. The EVR system is described in a publication by Peter C. Goldmark entitled, "Color Electronics Video Recording" which appeared in the *Journal of the Society of Motion Picture and Television Engineers*, Vol. 79, August, 1970, pp. 677-686. In this system an electron beam recorder is used to record separate luminance and encoded chrominance frames at 60 fields/sec. A cathode ray tube flying spot scanner is used to read out the luminance and chrominance signals. This system as described is limited to the use of pre-recorded material since the consumer cannot conveniently make his own encoded film with an electron beam recorder. U.S. Pat. No. 3,535,992 issued to P.C. Goldmark, et. al. represents a relatively complex approach to providing the desired format with optical recording.

A preferred system for encoding color information on a black and white format is given in pending application, "Color Television Encoding and Decoding System," Ser. No. 820,602, filed Aug. 1, 1977, assigned to the same assignee as the present invention and having the present four inventors as four of the co-inventors. In this application the readout is accomplished using uniform film motion with two relatively inexpensive line scanner arrays rather than using relatively expensive frame scanners or cathode ray tube line scanners. The line arrays are used with simplified synchronization systems since they do not have the non-uniform scan velocities of cathode ray tubes.

These black and white encoded systems, however, all require relatively extensive modifications to the movie camera and are thus incompatible with existing movie cameras. Only the first system, using the three registered color cameras, uses conventional color film and thus an unmodified movie camera. These cameras are, however, very expensive.

Some systems in the prior art have used a cathode ray tube flying spot scanner, for example U.S. Pat. No. 2,776,335 issued to A. E. Mann and U.S. Pat. No. 3,378,635 issued to P.C. Goldmark, et. al. These CRT's were used in color film scanners in U.S. Pat. Nos. 3,619,485 and 3,569,612 issued to D. J. Cross, et. al. and U.S. Pat. No. 3,619,483 issued to W. K. Boots, et. al. These systems often use modified raster scans so as to simplify the film motion. Here a cathode ray tube is imaged onto the film with the transmitted light applied to three photomultiplier tubes through appropriate color filters. These systems have a variety of problems including the lag in the CRT phosphor, the poor color response of the phosphor and the inadequate brightness of the CRT. In addition the components involved are bulky and expensive. If a CRT is used with any type of striped encoded format, the non-uniform scan velocity necessitates synchronization information throughout the image region. Synchronization information of this type results in various chroma errors due to luminance information interfering with the synchronization signal. For example a black region in the scene results in a loss of synchronization information.

The new CCD photosensitive arrays are excellent candidates for film scanning because of their small size and low potential cost. In addition, they have extremely accurate scanning speeds determined solely by the clock frequency. These devices are described in a paper entitled "Imaging Devices Using the Charge-Coupled Concept," in *Proc. IEEE*, Vol. 63, pp. 38-67, January 1975. They have been described as two-dimensional color TV cameras in U.S. Pat. No. 3,971,065 issued to B. E. Bayer and in U.S. Pat. No. 4,007,488 issued to M. Moishita. These two-dimensional camera devices, however, are extremely expensive and difficult to fabricate free of defects. Their use in consumer products appears to be a number of years away.

The single line CCD devices, however, are presently available at relatively low costs. A color film scanner using solid state line scan devices is described in U.S. Pat. No. 3,952,328 issued to C. H. Biber. In this patent, color film using the conventional frame rates of 18-24 frames per second is used. Since these rates are incompatible with the television scan rates, the scanning system of the color TV receiver is modified in accordance with the film rate. This results in a very complex television receiver for use with different scan rates. In addition, the resultant image will have significant flicker. The color decomposition is accomplished using dichroic mirrors and three line scan arrays, one for each color. These must be positioned very accurately to avoid misregistration and its associated color errors. They would probably require periodic readjustment.

A system using a single line scan array is described in U.S. Pat. No. 3,953,885 also issued to C. H. Biber. As in the previous patent this system requires a specially modified color television receiver. It is used to scan color film of the type employing longitudinal film stripe triplets. The color triplets on the film are imaged onto a single line array with the individual elements of the array carefully registered with the individual colors on the film. This use of a single array for all of the information requires a large number of elements in the array. Since the resultant scanned signal is used for luminance and chrominance, the color triads must occur at a frequency beyond the luminance bandwidth. Thus the number of elements in the line array is approximately three times the number of luminance picture elements.

In addition to the high resolution requirements of the line array, it must be exactly registered to the color stripes on the film. This may be disturbed by factors such as film shrinkage and various mechanical variations. Again, these problems are aggravated by the use of a color triad repetition frequency which is above the luminance bandwidth.

SUMMARY OF THE INVENTION

An object of this invention is to provide a system for recording and playing back color television images using conventional unmodified movie cameras and color television receivers. A further object of this invention is to provide a playback system where the film is moved uniformly and is scanned by inexpensive line scanning arrays. A further object of this invention is to provide an encoding and decoding system for reading the color information from the film without registration difficulties.

Briefly, in accordance with the invention, information from a color image is recorded onto color film at a frame rate equal to the television field rate. On playback the film is moved uniformly and a portion of the film is illuminated corresponding to a line in the color image. The resultant light is decomposed into its composite colors and imaged onto line scanning photosensitive arrays. These arrays are scanned to provide scanned signals which can be decoded and combined to form the standard color television signals.

DESCRIPTION OF THE PREFERRED EMBODIMENT

Figure 1:
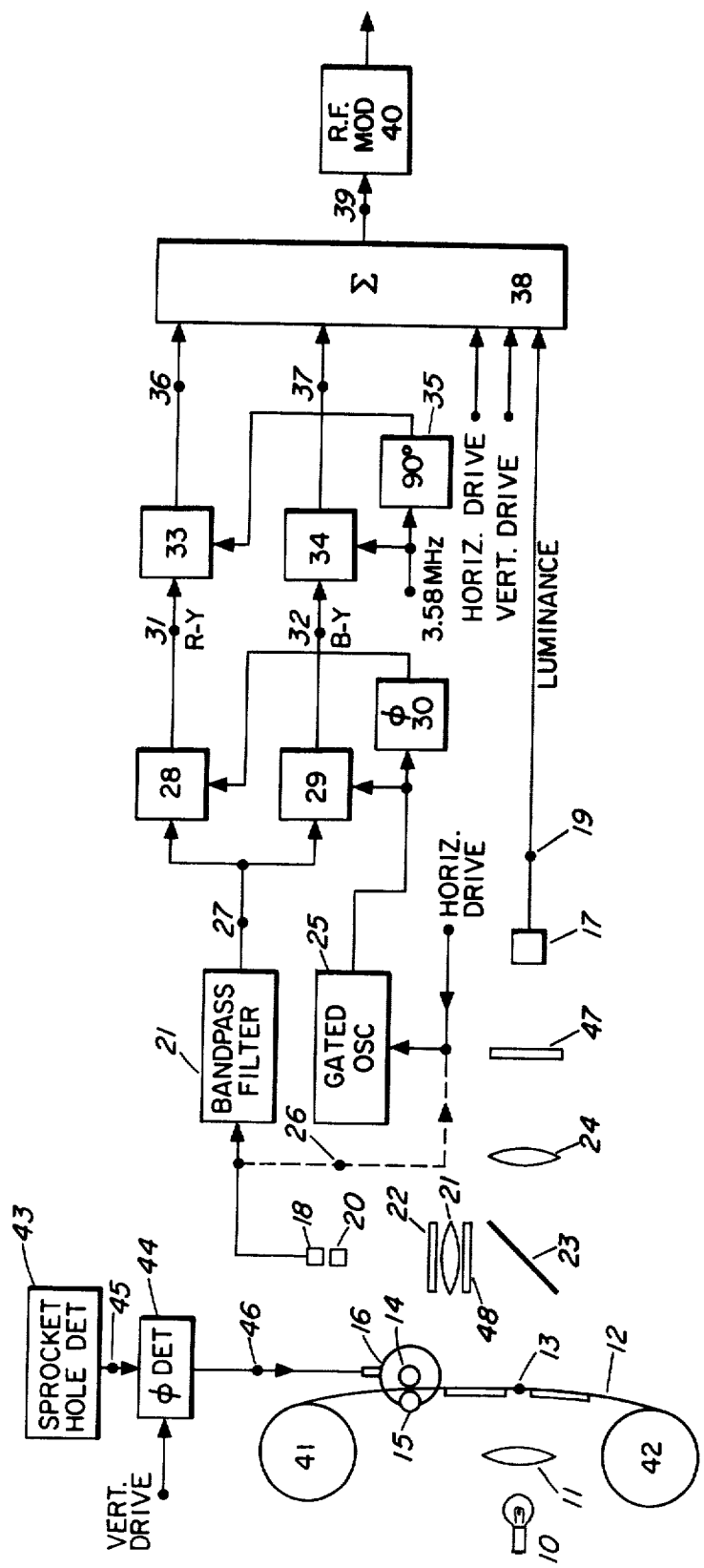
FIG. 1 is a schematic representation of an embodiment of the system using a repetitive array of color filters.
Figure 1A:
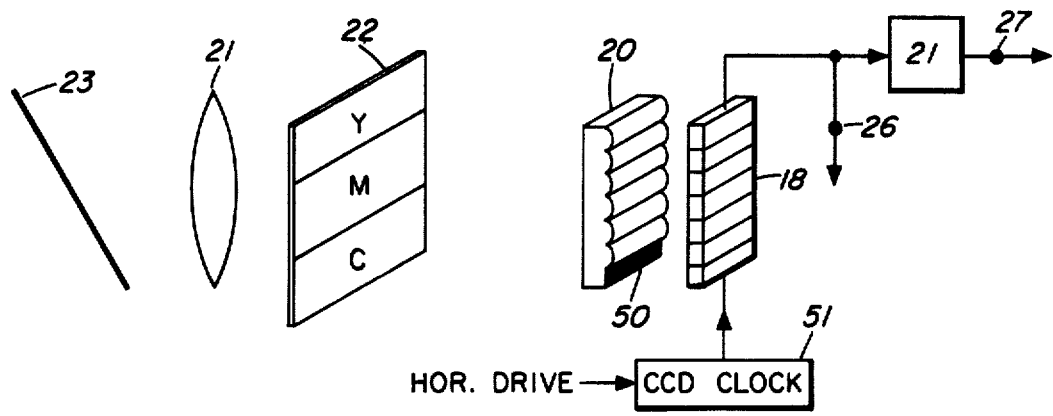
FIG. 1A is a more detailed view of the chrominance channel.
Figure 4:
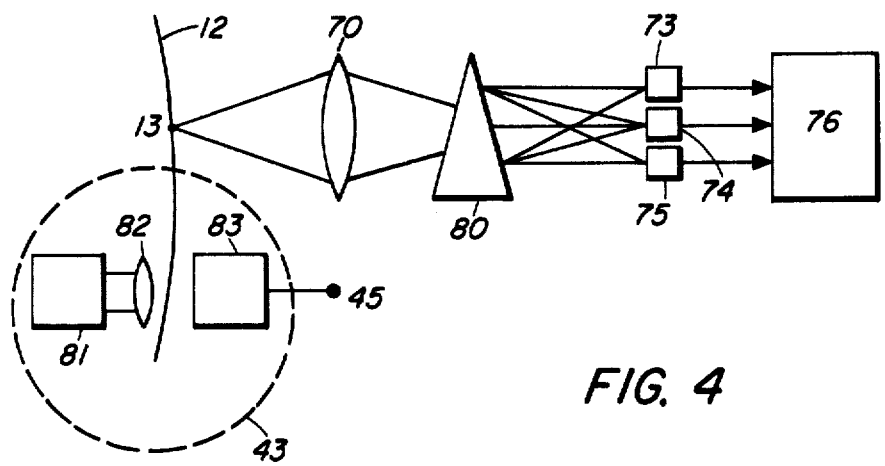
FIG. 4 is a representation of an alternate optical arrangement using color dispersion.

An understanding of the broad aspects of the invention may best be had by reference to FIGS. 1 and 1A of the drawings. FIG. 1 illustrates an embodiment of the invention where the chrominance information is derived by imaging through a repetitive array of color filters. FIG. 1A is a detailed view of the chrominance portion. A standard television sync generator is used to supply the three basic signals; horizontal drive, vertical drive, and the 3.58 mHz color carrier. The color film 12 has been initially exposed at a film frame rate equal to the television field rate in a conventional movie camera. Thus, using the U.S. standards, the film frame rate is 60 per second. In the television playback system shown in FIG. 1 the film is advanced from the supply reel 42 onto the takeup reel 41 at the required rate of one film frame per television field interval. This is accomplished by driving capsstan 14 and guide 15 using motor 16. To insure that the film is pulled at the correct speed a sprocket hole signal 45 is developed using sprocket hole detector 43. For clarity detector 43 is detailed in FIG. 4 showing a light source 81, lens 82 for focusing onto the sprocket hole, and photocell 83 for detecting the transmitted light and producing sprocket hole signal 45. Returning to FIG. 1, the sprocket hole signal 45 is compared to the vertical drive signal in phase detector 44 to develop motor control signal 46. Control signal 46 drives motor 16 in a conventional servomechanism system to insure that the film translates at the required speed.

Light source 10 illuminates a horizontal line in the film 13 using condenser lens 11. In this embodiment the illuminated line is split into two images, a luminance image and a chrominance image using light splitter 23, a partially reflective mirror. The luminance image is focused onto photosensitive line array 17 using lens 24. In color television the luminance signal represents a weighted sum of the primary colors. To achieve the desired weighting color filter 47 is used to enhance and/or suppress the various portions of the visible spectrum. This color filtering can also be accomplished by using a color selective beam splitter 23. Partially reflecting mirror 23 can be a dichroic mirror where the transmitted portion of the spectrum, with or without filter 47, provides the desired luminance spectrum. In some cases with the proper light source spectrum and film characteristics the filter 47 will not be necessary. Also, this filter could be placed in front of the light source 10 and filter both the luminance and chrominance channels. Photosensitive line array 17 can be a CCD line array which is commercially available. This line array is driven with a clock similar to the chrominance line array 18 shown in FIG. 1A. The clock source 51 is started at each line using the horizontal drive signal from the sync generator. The frequency is chosen so as to sequentially scan through all of the elements during the time of a scan line. The resultant scanned signal 19, the luminance signal, is applied to summing device 38 along with the synchronization information where the composite video signal 39 is formed.

The chrominance information is reflected off light splitter 23 and applied, through a repetitive array of color filters, to photosensitive line array 18. The chrominance information can be derived by using a sequence of color filters placed directly on the surface of photosensitive line array 18. However, this would require a specially constructed line array with its associated added expense. A preferred embodiment is shown in FIGS. 1 and 1A using a lenticular imaging system. These systems are well-known in the art for both film and television systems as a convenient method of encoding color stripe information. One example of a lenticular imaging system used with a color television camera is U.S. Pat. No. 2,733,291 issued to R. D. Kell. The use of the combination of the coarse color stripes 22 and lenticular lens array 20 provides the filtering of the line image 13 by a repetitive sequence of color filters.

The coarse color grating 22 can be a single triad of color filters or a repetitive array containing more than three filter stripes. In either case the lenticular lens array 20 images the coarse color grating 22 to provide a repetitive color filter pattern on photosensitive array 18. The photosensitive array should include at least one photosensitive element per imaged color stripe, although greater sampling will simplify the filtering problem. In any case, exact registry of the array elements with the color triads is not required. The coarse color grating 22 contains a set of primary colors. As shown in FIG. 1A, one example of primary colors are the subtractive primaries; yellow, magenta and cyan. An alternative set are the additive primaries; red, green, and blue. Actually, any independent set of primary colors can be used where no color is a linear combination of the other two.

The scanned signal from line array 18 is applied to band pass filter 21 which isolates the color subcarrier frequency and its sidelobes. The subcarrier frequency represents the frequency at which the repetitive color triads are scanned. In a neutral or gray area the output at this frequency will be zero because of the equal intensity of each stripe image. In colored areas the phase and amplitude of the subcarrier represents the hue and saturation of the color, as with the standard broadcast signal.

A phase reference is required to decode the filtered scanned chrominance signal 27. In the prior art, as with the EVR system, a continuous synchronization image was required within the image. These systems suffer from a variety of problems primarily due to the image components interfering with the synchronizing signal. However, the use of solid state photosensitive arrays made with integrated circuit techniques, such as CCD arrays, have relatively exacting geometric tolerances. As a result the phase reference signal can be derived by starting it properly at the beginning of each scanning line. No reference information throughout the line, with its associated problems is required.

In the system shown in FIG. 1, ignoring the dashed line, a horizontal drive or synchronization signal is used to start gated oscillator 25 which is adjusted to oscillate at the subcarrier frequency. The horizontal timing pulse starts the oscillator at the same phase at each line. This is adjusted to be the correct phase to decode the chrominance signal 27. An alternate approach is the use of an optical reference tied to the lenticular array 20. A synchronization reference mark 50 on the array is imaged onto array 18 along with the color stripes. Since this mark has a fixed relationship with the imaged color stripes, it can be used to start gated oscillator 25. In this approach no adjustment of phase is required since the proper phase relationship is built into lenticular lens array 20. As shown in the dashed line the signal 26 derived from mark 50 is used to start gated oscillator 25. The horizontal drive signal can be used to gate signal 26 from the scanned signal although this may not be necessary. The signal from mark 50 can be separated by amplitude selection. The phase reference signal from gated oscillator 25 is applied to synchronous detectors 28 and 29 to demodulate the color difference signals. Two convenient color difference signals are R-Y and B-Y. In a symmetrical system, where the color filters are balanced and equally spaced, R-Y and B-Y will be separated by 120°. Thus the reference signal can first be applied to synchronous detector 29 to demodulate the B-Y signal 32 and then applied through a 120° phase shifter 30 to synchronous detector 28 to produce the R-Y signal 31. Other color difference signals which can be used are I and Q. Alternatively, three color difference signals can be generated by adding G-Y.

A luminance signal and two color difference signals are the color television signals required to produce a standard composite video signal. As shown in FIG. 1, the R-Y and B-Y signals, 31 and 32, are applied to modulators 33 and 34. These are each driven from the 3.58 mc color carrier from the sync generator. The carrier is applied directly to the B-Y modulator 34 and through a 90° phase shifter 35 to the R-Y modulator 36. The modulated color difference signals 36 and 37 are added to luminance signal 19 in summation device 38 along with the synchronization signals, to produce the composite video signal 39. This can be used with an r.f. modulator 40, at the carrier of some TV channel, to produce a signal which can be directly coupled into the antenna of a standard, unmodified color TV receiver.

In the system of FIG. 1 the line 13, representing a line in the color image, was decomposed into two line images where all of the chrominance information is derived from one line image. An alternate approach is to provide two of the colors from photosensitive array 18 and the third from the luminance array 17. Here the coarse filter 22 contains sequences of two colors, for example red and blue filters. The synchronization problem is made much easier since it is only necessary to determine the polarity of a color subcarrier rather than its exact phase. Thus more error can be tolerated in the output of gated oscillator 25. The peak and valley of the resultant scanned signal from array 18 will each correspond to either red and blue or vice versa. A phase detector is used to resolve the polarity ambiguity. This phase detector, which compares the output of gated oscillator 25 with the color carrier, can have a phase tolerance approaching ±90° without making an error. The remainder of the color information, in this case the green signal, is derived from the luminance signal 19. The red and blue demodulated signals are subtracted from the luminance to provide the green signal. Although this system is more tolerant of phase errors, it imposes a more severe geometric constraint on the positioning of the two photosensitive arrays 17 and 18. If all of the chrominance information is taken from one array, any misregistration between that photosensitive array and that used for luminance cannot cause colored edges. However, when the chrominance information is split between two or more arrays, the relative geometric position must be controlled more accurately to avoid the color errors common to misregistration.

Figure 2:
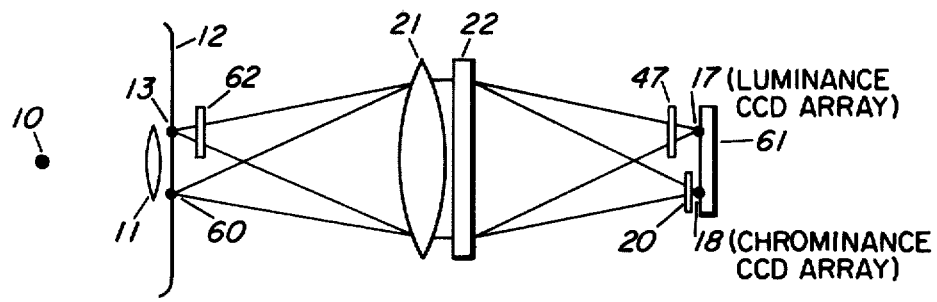
FIG. 2 is a representation of an alternate optical arrangement using adjacent film frames.

An alternate embodiment for imaging a line in the color image is shown in FIG. 2. Here again light source 10 illuminates film 12 using condensing lens 11. In addition to illuminating line 13 on the film, line 60 is also illuminated. Line 60 corresponds to the same line in the color image and is separated from line 13 by one film frame. This provides a more convenient optical system for decomposing a line in the color image into its component colors. For example in this embodiment a single lens 21 is used to image both lines 13 and 60 onto the chrominance and luminance arrays 18 and 17 respectively. The chrominance imaging system is identical to that of FIG. 1A with the coarse array of color filters 22 and the lenticular lens array 20. The coarse array 20, in general, has an average color transmissin which is neutral. Therefore this array does not disturb the imaging of the luminance line. Unless this coarse grating 20 interacts with a lenticular lens array, it is essentially ignored. Thus the luminance is imaged, as in FIG. 2, onto photosensitive line array 17 through color filter 47. A separator 61 is used to keep line arrays 17 and 18 exactly one film frame apart so that each array views the same line in the color image. The small time difference between film frames of 1/60 sec will not significantly affect the reproduction of motion.

In the encoded system of FIGS. 1, 1A and 2, some care should be taken that image information having frequency components in the vicinity of the color subcarrier does not cause color errors. This is accomplished to some degree by lenticular lens array 20 which, in addition to providing repetitive color filtering, provides a diffuser action which reduces the high frequency components of line image 13. This action can be further enhanced by the use of an additional diffuser. For example, diffuser 62 in front of line 13 in FIG. 2 can avoid this undesired color cross-talk by limiting the high frequency response in the horizontal direction. In FIG. 1, a somewhat diffuse structure can be placed between light splitter 23 and 21. An alternative arrangement is the use of a weak cylindrical lens 48 adjacent to lens 21. This structure reduces the horizontal resolution by a defocusing action. In all of these arrangements the luminance information is unaffected.

Figure 3:
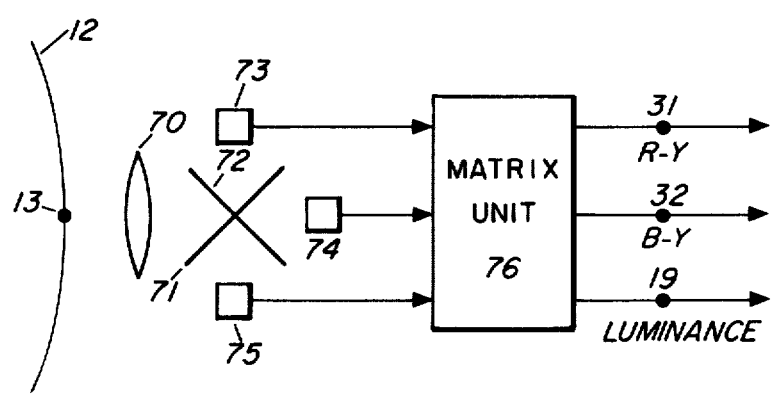
FIG. 3 is a schematic representation of an embodiment of the system using light-splitting color filters.

The use of color gratings with the subsequent decoding considerations can be avoided by decomposing the illuminated line into its three component primary colors. As shown in FIG. 3 illuminated line 13 on film 12 is imaged using lens 70 onto three photosensitive line arrays; 73, 74, and 75. The light splitter, crossed mirrors 71 and 72, can be partially silvered mirrors. In that case color filters representing the primaries would be placed in front of each line array. A preferred approach is to use dichroic mirror light splitters. For example, mirror 71 can be a dichroic mirror which transmits cyan and reflects red, while dichroic mirror 72 transmits yellow and reflects blue. In this way arrays 73, 74 and 75 would receive red, green and blue information respectively. The color information is combined in matrix unit 76, in the conventional fashion, to produce color difference signals 31 and 32 and luminance signal 19.

An alternate method of decomposing the light from the illuminated line, corresponding to a line in the color image, is shown in FIG. 4. Rather than using color filters, line 13 is imaged using lens 70, through a dispersive prism 80. This prism, having a refractive index which is color dependent, results in a different image position for each color. Photosensitive line arrays 73, 74 and 75 are positioned so as to receive the decomposed light images corresponding to the three primary colors. In this way no filtering is required and arrays 73, 74 and 75 can be packaged into a convenient two-dimensional array and avoid the color registration problems of the system of FIG. 3. The primary color signals representing the scanned signals from each array respectively are again combined to matrix structure 76 to produce the standard color television signals. As previously indicated the sprocket hole detector 43, for controlling the film speed, is also shown in FIG. 4.

An alternate approach to the decomposition of the line in the color image into three primary colors is to use a version of the system of FIG. 2. Rather than two frames, the lines of three adjacent frames are illuminated. These are imaged, for example with a single lens, onto three CCD arrays. Appropriate color filters are placed in each of the color paths so that each of the scanned signals represents a primary color. In this embodiment light splitting is not required.

In general the systems shown in FIGS. 1, 1A, 2 and 4 have an effective immunity to color misregistration. The significant registration problem is that between the various colors. Thus degrees of misregistration between luminance and chrominance information can be tolerated because it does not result in colored edges. In FIGS. 1, 1A, 2 and 4 the color information essentially stays in a single optical path. This is unlike FIG. 3, with its light splitters and separate optical paths for each color. In FIG. 3 the individual arrays 73, 74 and 75 need to be carefully adjusted to avoid color misregistration. In the encoded systems of FIGS. 1, 1A and 2, such adjustments do not exist since a single optical path with a single array has all of the color information. In FIG. 4 a single optical path is used with only disperser 80 separating the illuminated line into its component colors. Thus registration problems will not exist between arrays 73, 74 and 75 as long as they are initially fabricated as a single unit. No mirrors are used with their associated separate optical paths which can easily result in registration errors.

Figure 5:
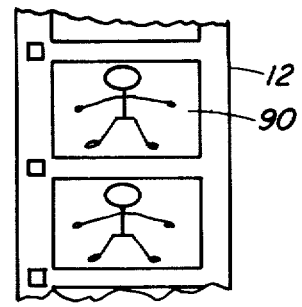
FIG. 5 illustrates an alternate film format having a distorted aspect ratio.

As was mentioned earlier, one of the unique aspects of this invention is the ability to create color television signals from color film taken in conventional cameras operated at 60 frames/sec. Since these films will be used solely for color television they can be altered in a number of ways without concern about their compatibility in conventional optical projectors. For example the aspect ratio can be altered in any suitable manner for various desired results. In FIG. 5 the height of the image 90 on film 12 has been reduced to reduce the film consumption for a given playing time. This will not cause distortion in the final reproduced image since only single lines are imaged at a time. As long as the film speed is properly controlled the reproduction will be accurate.

Figure 6:
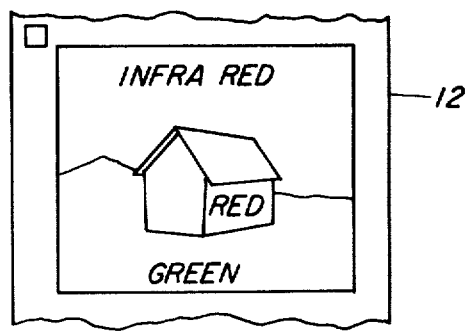
FIG. 6 illustrates an alternate film format using false color.

Another way of taking advantage of the fact that the film need not be shown in optical projectors is shown in FIG. 6. Here a false color reproduction of a scene is used. In the original image the sky was blue, whereas in this reproduction the blue sky has been recorded as infrared. The motivation for this change is the poor blue response of the silicon photodiodes used in photosensitive line arrays. If this color is recorded as infrared, using the appropriate film dyes, the blue information will appear in a region where silicon photodiodes have excellent response. If such transformation of any of the primary colors takes place it is then taken into account in the subsequent decomposition and filtering of the illuminated line. In effect the definition of primary colors is broadened to include the transformed colors. Another type of transformation of colors which can prove convenient is the use of a negative rendition which, in some circumstances is simpler to produce. The false colors of the negative can readily be decomposed and scanned and used to produce the correct reproduction.

Gamma correction is often used in television systems to compensate for the non-linearity of the cathode ray tube and the film. In the systems of FIGS. 3 and 4 this correction can be applied directly to the three primary scanned signals prior to the matrix operation. In the encoded systems of FIG. 1, the color difference signals 31 and 32 and the luminance signal 19 can be combined to form the primary signals red, green, and blue. After applying the gamma correction to the three signals they can then be matrixed to form the required color television signals. This complexity can be avoided, however, by a compromise system where only the luminance signal 19 is subjected to gamma correction. This will work for most low saturation colors. The gamma correction itself can be a relatively simple non-linear circuit such as one or more biased diodes which alter the gain at different voltage levels.

What is claimed is:

1. Apparatus for providing standard color television signals from a color image recorded as a series of frames on color film comprising:
   a pair of photosensitive line arrays;
   a repetitive array of color filters;
   means for uniformly translating the film;
   means for illuminating a portion of the film corresponding to a line in the color image;
   means for decomposing the light from the illuminated portion of the film into a first line image representing the luminance component of the decomposed light and a second line image which is filtered through the repetitive array of color filters along the image of the illuminated line;
   means for imaging the first and second line images onto the pair of photosensitive line arrays;
   means for simultaneously scanning the pair of line arrays to produce a pair of scanned signals; and
   means for forming combinations of the scanned signals to produce standard color television signals.

2. Apparatus as recited in claim 1 wherein the repetitive array of color filters are a repetitive sequence of the primary colors.

3. Apparatus as recited in claim 1 wherein the repetitive array of color filters includes an array of coarse color filters positioned adjacent to the means for imaging the second line image onto one of the photosensitive line arrays and including a lenticular array of cylindrical lenslets positioned adjacent to the line array.

4. Apparatus as recited in claim 3 including a color synchronization reference mark at one end of the lenticular array.

5. Apparatus as recited in claim 1 wherein the scanned signal corresponding to the second line image is demodulated into an array of color difference signals using a plurality of synchronous detectors and a synchronized reference signal having a frequency equal to the frequency produced when scanning the image resulting from the repetitive array of color filters.

6. Apparatus as recited in claim 5 including a source of horizontal timing information wherein the synchronized reference signal is produced by using the horizontal timing information to determine the starting phase of a repetitive signal.

7. Apparatus as recited in claim 5 wherein the synchronized reference signal is produced by scanning a reference mark on the second line image.

8. Apparatus as recited in claim 1 wherein the illuminated portion of the film includes two lines on adjacent frames of the film each corresponding to the line in the color image and the means for decomposing the light from the illuminated portion of the film includes means for utilizing the line image from one frame as the first line image representing the luminance components and of utilizing the line image from the adjacent frame as the second line image which is filtered through a repetitive array of color filters.

9. Apparatus as recited in claim 1 wherein the recorded color image is recorded as false color whereby a color in the color image corresponds to a different recorded color on the film.

10. In a method for producing standard color television signals from a color image recorded as a series of frames on color film the steps of:
    translating the film uniformly;
    illuminating a portion of the film corresponding to a line in the color image;
    forming two line images of the illuminated portion of the film with the first line image representing the luminance portion of the image;
    filtering the second line image with a repetitive set of color filters;
    imaging each line image onto a separate photosensitive line array;
    simultaneously scanning both line arrays to produce a pair of scanned signals; and
    synchronously detecting the scanned signal corresponding to the second line image with a plurality of synchronous detectors to provide color difference signals.

11. Apparatus for providing standard color television signals from a color image recorded as a series of frames on color film wherein the recorded color image is recorded as false color whereby a color in the color image corresponds to a different recorded color on the film comprising:
    a plurality of photosensitive line arrays;
    a dispersive light splitter;
    means for uniformly translating the false color film;
    means for illuminating a portion of the false color film corresponding to a line in the color image;
    means for decomposing the light from the illuminated portion of the false color film, corresponding to the line in the color image, into its component colors using the dispersive light splitter;
    means for imaging the decomposed light onto the plurality of photosensitive line arrays;
    means for simultaneously scanning the plurality of line arrays to produce a plurality of scanned signals; and
    means for forming combinations of the scanned signals to produce standard color television signals.

12. Apparatus as recited in claim 9 or 11 wherein blue colors in the color image are recorded on the color film as a longer wavelength color whereby the photosensitive line arrays will not have to be responsive to the blue color.

* * * * *